(12) United States Patent
Tanaka et al.

(10) Patent No.: US 12,496,638 B2
(45) Date of Patent: Dec. 16, 2025

(54) METHOD OF FABRICATING THREE-DIMENSIONAL OBJECT AND APPARATUS FOR FABRICATING THREE-DIMENSIONAL OBJECT

(71) Applicants: Kohichiroh Tanaka, Kanagawa (JP); Shozo Sakura, Kanagawa (JP); Yohei Osanai, Kanagawa (JP); Yunsheng Sun, Telford England (GB)

(72) Inventors: Kohichiroh Tanaka, Kanagawa (JP); Shozo Sakura, Kanagawa (JP); Yohei Osanai, Kanagawa (JP); Yunsheng Sun, Telford England (GB)

(73) Assignee: Ricoh Company, Ltd., Tokyo (JP)

( * ) Notice: Subject to any disclaimer, the term of this patent is extended or adjusted under 35 U.S.C. 154(b) by 395 days.

(21) Appl. No.: 18/170,000

(22) Filed: Feb. 16, 2023

(65) Prior Publication Data

US 2023/0271256 A1    Aug. 31, 2023

(30) Foreign Application Priority Data

Feb. 25, 2022   (JP) .................................. 2022-027908
Nov. 8, 2022    (JP) .................................. 2022-178819

(51) Int. Cl.
*B22F 10/50*    (2021.01)
*B22F 12/63*    (2021.01)
(Continued)

(52) U.S. Cl.
CPC .............. *B22F 10/50* (2021.01); *B22F 12/63* (2021.01); *B29C 64/153* (2017.08);
(Continued)

(58) Field of Classification Search
CPC ...... B22F 10/50; B22F 12/63; B22F 2998/10; B22F 12/30; B22F 12/38; B22F 12/52;
(Continued)

(56) References Cited

U.S. PATENT DOCUMENTS

2009/0169664 A1*  7/2009  Cox .................... B22F 12/63
                                            425/217
2013/0029001 A1   1/2013  Gunther et al.
(Continued)

FOREIGN PATENT DOCUMENTS

| CN | 209832636 U | 12/2019 |
| JP | 5-309747 | 11/1993 |
| JP | 2017-001381 | 1/2017 |

OTHER PUBLICATIONS

Extended European Search Report for 23157029.2 mailed on Jul. 10, 2023.

*Primary Examiner* — Ricardo D Morales
(74) *Attorney, Agent, or Firm* — IPUSA, PLLC

(57) ABSTRACT

There is provided a method of fabricating a three-dimensional object. The method includes supplying, flattening, and collecting. The supplying supplies, with a powder supplier, powder to a fabrication chamber. The fabrication chamber includes a fabrication stage to store powder and an outer edge portion outside the fabrication stage, the outer edge portion having one bottom surface. The flattening flattens, with a flattener, the powder supplied by the supplying. The collecting collects, with a powder collector, the powder having overflowed from the fabrication stage to the outer edge portion by the flattening into the fabrication stage.

11 Claims, 3 Drawing Sheets

(51) Int. Cl.
*B29C 64/153* (2017.01)
*B29C 64/188* (2017.01)
*B29C 64/35* (2017.01)
*B33Y 10/00* (2015.01)
*B33Y 30/00* (2015.01)
*B33Y 40/00* (2020.01)

(52) U.S. Cl.
CPC ............ *B29C 64/188* (2017.08); *B29C 64/35* (2017.08); *B33Y 10/00* (2014.12); *B33Y 30/00* (2014.12); *B33Y 40/00* (2014.12); *B22F 2998/10* (2013.01)

(58) Field of Classification Search
CPC ........ B22F 12/60; B22F 10/14; B29C 64/153; B29C 64/188; B29C 64/35; B29C 64/218; B29C 64/357; B29C 64/165; B33Y 10/00; B33Y 30/00; B33Y 40/00; Y02P 10/25
See application file for complete search history.

(56) References Cited

U.S. PATENT DOCUMENTS

| | | |
|---|---|---|
| 2015/0343533 A1 | 12/2015 | Park et al. |
| 2016/0075084 A1 | 3/2016 | Sakura |
| 2016/0236422 A1 | 8/2016 | Sakura |
| 2016/0361874 A1* | 12/2016 | Park .................... B29C 64/357 |
| 2017/0072646 A1 | 3/2017 | Sakura |
| 2017/0113411 A1 | 4/2017 | Watanabe et al. |
| 2017/0120521 A1 | 5/2017 | Sakura et al. |
| 2017/0305141 A1 | 10/2017 | Sakura |
| 2020/0070412 A1 | 3/2020 | Sun et al. |
| 2020/0079011 A1 | 3/2020 | Iwatsuki et al. |
| 2020/0362142 A1 | 11/2020 | Saito et al. |
| 2021/0023778 A1 | 1/2021 | Sohichiroh et al. |
| 2021/0299969 A1 | 9/2021 | Sakura |
| 2022/0001450 A1 | 1/2022 | Osanai |
| 2022/0363008 A1 | 11/2022 | Hayakawa et al. |
| 2023/0024086 A1 | 1/2023 | Osanai et al. |

* cited by examiner

METHOD OF FABRICATING THREE-DIMENSIONAL OBJECT AND APPARATUS FOR FABRICATING THREE-DIMENSIONAL OBJECT

CROSS-REFERENCE TO RELATED APPLICATION

This patent application is based on and claims priority pursuant to 35 U.S.C. § 119 (a) to Japanese Patent Application Nos. 2022-027908, filed on Feb. 25, 2022, and 2022-178819, filed on Nov. 8, 2022, in the Japan Patent Office, the entire disclosure of each of which is hereby incorporated by reference herein.

BACKGROUND

Technical Field

Embodiments of the present disclosure relate to a method of fabricating a three-dimensional object and an apparatus for fabricating a three-dimensional object.

Related Art

As a three-dimensional fabricating apparatus that fabricates a solid (three-dimensional) object, there is known a three-dimensional fabricating apparatus that uses an additive fabricating method, for example. In the additive fabricating method, for example, flattened metal or non-metal powder is formed into a layer on a fabrication stage (hereinafter, referred to as fabrication chamber), a fabrication liquid is discharged to the layered powder (hereinafter, referred to as "powder layer") to form a layered fabrication object (hereinafter, referred to as "fabrication layer") in which powder particles are bonded together, and another powder layer is formed on the fabrication layer to form another fabrication layer, and these steps are repeated to laminate fabrication layers one on another, thereby fabricating a three-dimensional object.

As a conventional technique, there is disclosed a technique for automatically collecting powder generated at the outer edge portion of a fabrication chamber (hereinafter, referred to as excess powder) at the time of flattening the surface of the powder layer. By this technique, the excess powder is diffused by a roller and dropped into a groove provided beside the fabrication chamber, and the powder accumulated in the groove is conveyed and collected by a slider or a brush.

SUMMARY

According to an embodiment of the present disclosure, a method of fabricating a three-dimensional object includes supplying, flattening, and collecting. The supplying supplies, with a powder supplier, powder to a fabrication chamber. The fabrication chamber includes a fabrication stage to store powder and an outer edge portion outside the fabrication stage, the outer edge portion having one bottom surface. The flattening flattens, with a flattener, the powder supplied by the supplying. The collecting collects, with a powder collector, the powder having overflowed from the fabrication stage to the outer edge portion by the flattening into the fabrication stage.

According to another embodiment of the present disclosure, an apparatus for fabricating a three-dimensional object includes a fabrication chamber, a powder supplier, a flattener, and a powder collector. The fabrication chamber includes a fabrication stage to store powder and an outer edge portion outside the fabrication stage. The powder supplier supplies the powder to the fabrication chamber. The flattener flattens the powder supplied by the powder supplier. The powder collector collects, into the fabrication stage, the powder having overflowed from the fabrication stage to the outer edge portion by the flattener.

BRIEF DESCRIPTION OF THE DRAWINGS

A more complete appreciation of embodiments of the present disclosure and many of the attendant advantages and features thereof can be readily obtained and understood from the following detailed description with reference to the accompanying drawings, wherein.

Figure 1:
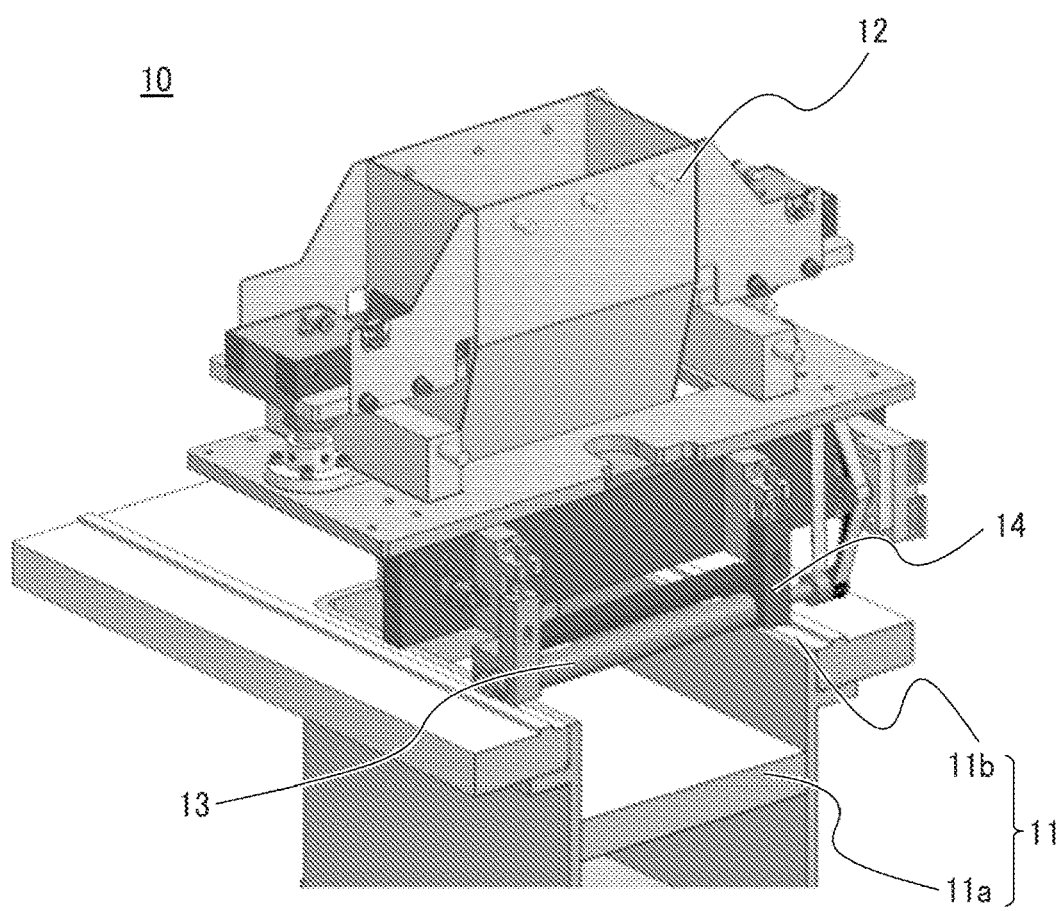
FIG. 1 is a schematic perspective view of an example of a three-dimensional object fabricating apparatus in the present disclosure.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

Three-Dimensional Object Fabricating Method And Three-Dimensional Object Fabricating Apparatus The three-dimensional object fabricating method of the present disclosure includes a powder supply step, a flattening step, and a powder collection step, and further includes other steps as necessary.

The three-dimensional object fabricating apparatus of the present disclosure includes a fabrication chamber, a powder supplier, a flattener, and a powder collector, and further includes other units as necessary.

The powder supply step is performed by the powder supplier, the flattening step is performed by the flattener, and the powder collection step is performed by the powder collector.

In the related art, the excess powder is collected using a slider. However, since there is a groove provided on the side of the fabrication chamber (the outer edge portion of the fabrication chamber has two bottom surfaces), there is a disadvantage that it is difficult to completely collect the powder fallen into the groove by machinery alone, and finally, the user needs to collect the powder in the groove by a suction device or the like. Furthermore, it is structurally difficult to completely suck the powder in the groove, and there is a disadvantage that roller banding may occur during fabrication and recoating due to the powder gradually accumulated in the groove, which results in deterioration of fabrication quality. There is also disadvantage that providing the groove complicates the structure and causes a cost increase.

In the present disclosure, since the outer edge portion of the fabrication chamber has one bottom surface, that is, no groove is provided in the outer edge portion of the fabrication chamber, the excess powder is collected with high efficiency and high cleaning performance is obtained. Thus, the occurrence of roller banding due to the accumulation of the powder can be prevented to improve the fabrication quality.

Hereinafter, embodiments of the present disclosure will be described with reference to the accompanying drawings. An outline of an example of a three-dimensional object fabricating apparatus of the present disclosure will be described with reference to FIGS. 1 to 4E.

As illustrated in FIG. 1, the three-dimensional object fabricating apparatus of the present disclosure includes a fabrication chamber 11 having a fabrication stage 11a that stores powder and an outer edge portion 11b outside the fabrication stage, a powder supplier 12, a flattener 13, and a powder collector 14.

The fabrication chamber 11 has the fabrication stage 11a that stores the powder at the bottom. The fabrication stage 11a is movable up and down in a vertical direction (height direction), and a three-dimensional object with a stack of fabrication layers is fabricated on the fabrication stage 11a.

The fabrication chamber 11 includes the outer edge portion 11b outside the fabrication stage. The powder overflowing from the fabrication stage 11a (hereinafter, also referred to as excess powder) moves to the outer edge portion 11b by a flattening process by a flattener described later.

The outer edge portion 11b has one bottom surface. That is, the outer edge portion 11b does not have a groove, so that the excess powder moved to the outer edge portion 11b by the flattening process can be collected to the fabrication stage with high efficiency by a powder collection process described later. Since the outer edge portion 11b has no groove, it is possible to prevent the remaining excess powder from accumulating on the outer edge portion 11b, and thus, it is not necessary to collect the powder by a suction device or the like.

The outer edge portion 11b preferably has at least one vertical wall. Accordingly, at the time of recoating (flattening) and powder collection, it is possible to prevent the excess powder from overflowing from the outer edge portion 11b, that is, from the three-dimensional object fabricating apparatus.

The height of the vertical wall of the outer edge portion 11b is not limited in particular, and can be appropriately selected according to the purpose. However, it is preferably the same as or lower than the height of the surface of the powder flattened (recoated) by the flattener described later. This narrows the gap between the ink jet head and the flattened surface of the powder, so that the lifting operation of the fabrication stage 11a can be omitted to improve the productivity of the three-dimensional object.

The distance of the gap between the vertical wall of the outer edge portion 11b and the powder collector described later is not limited in particular, and can be appropriately selected according to the purpose, but is preferably 0.5 mm or more. When the distance is 0.5 mm or more, it is possible to suppress non-slidability due to friction generated by intrusion of the powder into the gap between the vertical wall and the powder collector, so that the powder collector moves smoothly.

The flattener 13 transfers and supplies the powder to the fabrication chamber 11, and flattens the surface to form a powder layer which is a layered powder with a predetermined thickness.

The flattener 13 has a rod-like shape longer than the inner dimension of the fabrication chamber 11 (that is, the width of the portion to which the powder is supplied or the portion into which the powder is charged), and is reciprocated in the sub-scanning direction along the surface of the fabrication stage 11a by a reciprocating mechanism.

The flattener 13 horizontally moves so as to pass above the fabrication chamber 11 while being rotated by the motor. Accordingly, the powder is transferred and supplied onto the fabrication chamber 11, and the flattener 13 flattens the powder while passing over the fabrication chamber 11, thereby forming a powder layer.

The flattener 13 is not limited in particular, and can be appropriately selected according to the purpose, and examples thereof include a plate member, a roller member, and the like.

The flattener 13 is preferably attached directly or indirectly to the powder collector 14 described later. The recoating (flattening) and the collection of the excess powder can be performed simultaneously by moving the flattener 13 to which the powder collector 14 is attached.

The three-dimensional object fabrication apparatus preferably includes the flattener 13 and another flattener 13 in front of and behind the powder supplier 12 in a sub-scanning direction of the powder supplier 12.

The powder collector 14 is preferably located on the outer edge portion 11*b* in the fabrication chamber 11 of the three-dimensional object fabricating apparatus of the present disclosure, and is preferably located at both ends of the three-dimensional object fabricating apparatus. Thus, the excess powder on the outer edge portion 11*b* can be moved into the fabrication chamber 11.

The shape of the powder collector 14 is not limited in particular, and can be appropriately selected according to the purpose, and examples thereof include a plate-like member and the like.

The powder collector 14 preferably has an inclined face (an oblique cut) having a rear end closer to the fabrication chamber 11 than a front end in an advance direction of the powder collector 14. Thus, when the excess powder on the outer edge portion 11*b* is collected, the excess powder can be preferentially moved and collected onto the fabrication stage 11*a*.

The angle of the oblique cutting is not limited in particular, and can be appropriately selected according to the purpose, but is preferably 30° or more and 60° or less. Thus, the excess powder can be more preferentially moved and collected onto the fabrication stage 11*a*.

Figure 2:
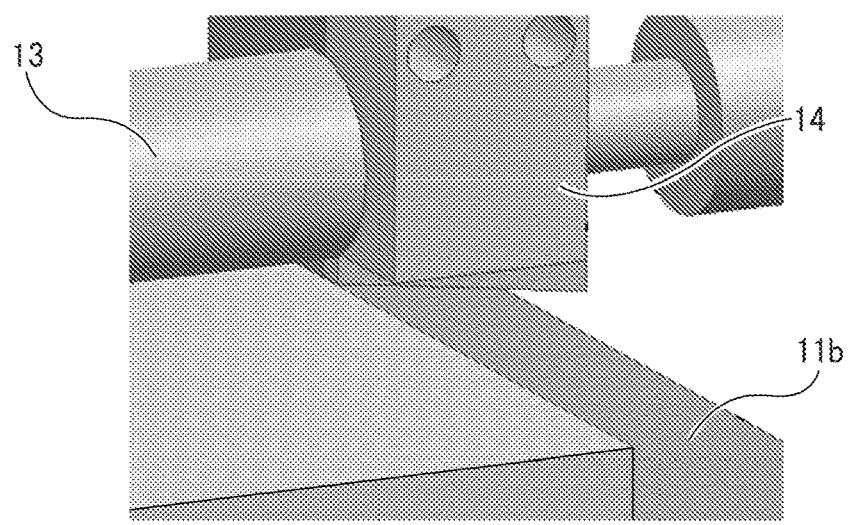
FIG. 2 is a schematic perspective view of another example of the three-dimensional object fabricating apparatus in the present disclosure.

As illustrated in FIG. 2, the powder collector 14 is preferably directly or indirectly attached to the flattener 13. The recoating (flattening) and the collecting of the excess powder can be performed simultaneously by moving the flattener 13 to which the powder collector 14 is attached.

The material of the powder collector 14 is not limited in particular, and can be appropriately selected according to the purpose, and examples thereof include metal and the like. The powder collector 14 may include a material other than the metal.

The metal is not limited in particular, and can be appropriately selected according to the purpose, and examples thereof include stainless steel and the like from the viewpoint of hardness.

The three-dimensional object fabrication apparatus preferably further includes the powder collector 14 and another powder collector 14 in front of and behind the powder supplier 12 in the sub-scanning direction of the powder supplier 12.

Examples of the three-dimensional object fabrication method and a recoating process by the three-dimensional object fabricating apparatus in the present disclosure will be described with reference to FIGS. 3A to 4E. However, the present disclosure is not limited to the following examples.

Referring to FIGS. 3A to 4E, a mode in which powder is supplied to the fabrication chamber 11 at the time of one-way movement in one direction in the reciprocating operation of the recoating unit 13 (hereinafter, also referred to as flattener 13) will be described.

For example, in the reciprocating operation of the recoating unit, the advantageous effect of the present disclosure can be sufficiently exhibited even in a mode in which the powder is supplied in a reciprocating manner, by preparing a plurality of recoating units.

Figure 3A:
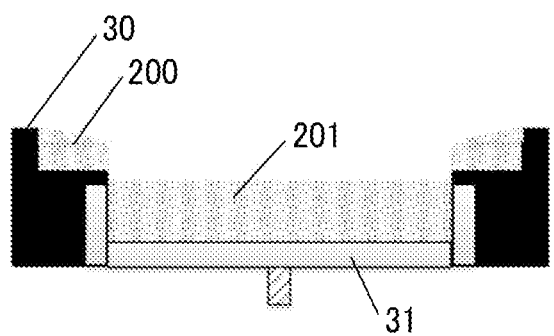
FIG. 3A is a schematic view of an example of an initial state of a cross-section of a fabrication chamber at the start in the three-dimensional object fabricating apparatus of the present disclosure.
Figure 3B:
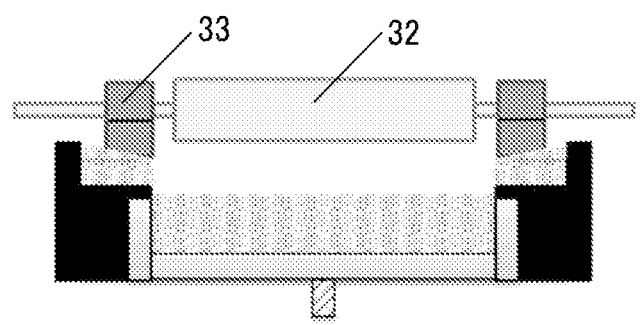
FIG. 3B is a schematic view of an example of a state immediately before a recoating unit passes in the three-dimensional object fabricating apparatus of the present disclosure.
Figure 3C:
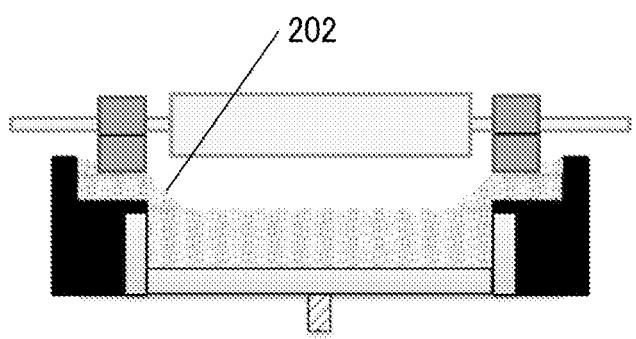
FIG. 3C is a schematic view of an example of a state immediately after the recoating unit has passed in the three-dimensional object fabricating apparatus of the present disclosure.
Figure 3D:
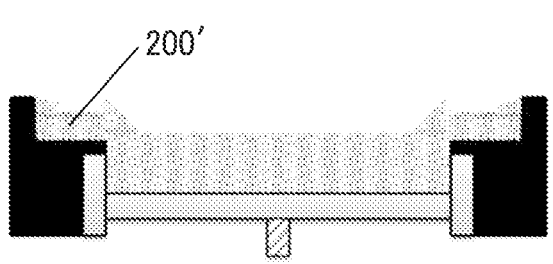
FIG. 3D is a schematic view of an example of an end state when the recoating unit in the three-dimensional object fabricating apparatus of the present disclosure has completed movement from the far side to the near side in the plane of drawing.

FIGS. 3A to 3D are cross-sectional views of the recoating unit corresponding to the passage of the entire time during which the recoating unit moves from the back side to the front side of the plane of the drawing. FIG. 3A illustrates an initial state of the cross section of the fabrication chamber at the start, FIG. 3B illustrates a state immediately before the recoating unit passes, FIG. 3C illustrates a state immediately after the recoating unit has passed, and FIG. 3D illustrates an end state when the recoating unit has completely moved from the back side to the front side of the plane of the drawing.

As illustrated in FIG. 3A, the fabrication stage 31 and a layered surface 201 thereon are lowered in height in order to avoid contact with the flattener 32.

FIG. 3B is a state immediately before the powder collector 33 passes and moves powder 200 on a top plate 30 of the three-dimensional fabricating apparatus of the present disclosure.

FIG. 3C is a state immediately after the powder collector 33 has passed and moved the powder 200 on the top plate 30 of the three-dimensional fabricating apparatus. As a result, with the movement of the recoating unit, the powder 200 on the top plate becomes powder 202 having been moved into the fabrication chamber.

FIG. 3D illustrates an end state when the recoating unit has moved from the back side to the front side of the plane of the drawing.

Figure 4A:
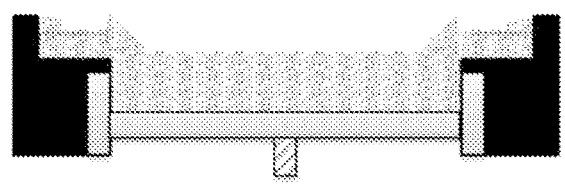
FIG. 4A is a schematic view of an example of an initial state of a cross-section of a fabrication chamber at the start in the three-dimensional object fabricating apparatus of the present disclosure.
Figure 4B:
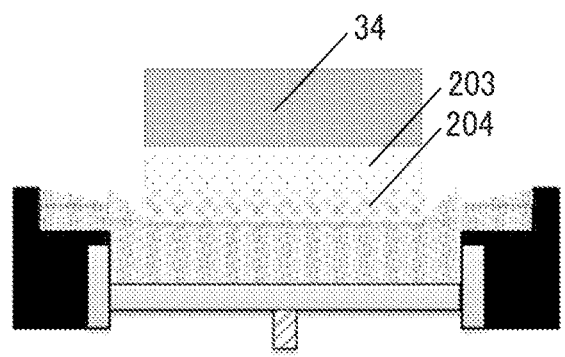
FIG. 4B is a schematic view of an example of a state immediately before a recoating unit passes in the three-dimensional object fabricating apparatus of the present disclosure.
Figure 4C:
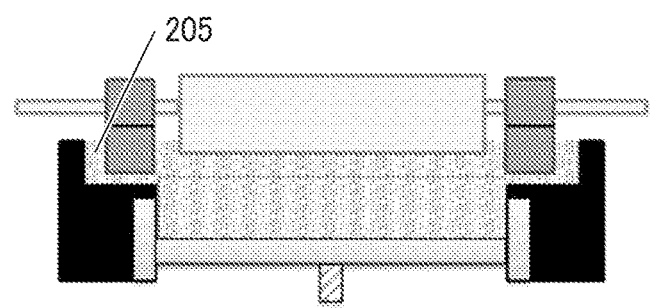
FIG. 4C is a schematic view of an example of a state in which the powder on the layered surface is flattened by a flattener in the three-dimensional object fabricating apparatus of the present disclosure.
Figure 4D:
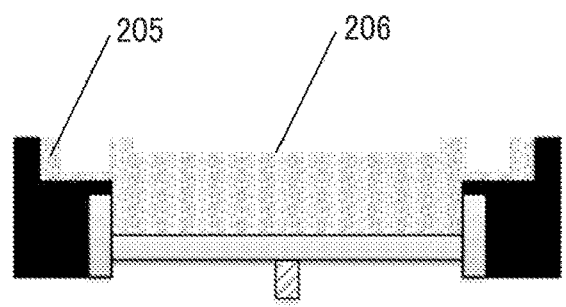
FIG. 4D is a schematic view of an example of a state immediately after the recoating unit has passed in the three-dimensional object fabricating apparatus of the present disclosure.
Figure 4E:
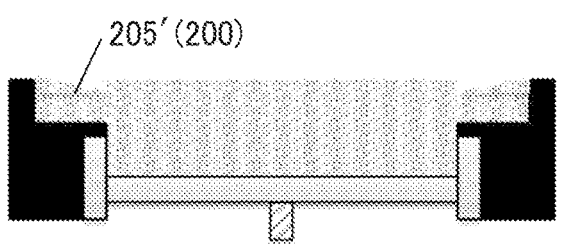
FIG. 4E is a schematic view of an example of an end state when the recoating unit in the three-dimensional object fabricating apparatus of the present disclosure has completed movement from the far side to the near side in the plane of drawing.

FIGS. 4A to 4E are cross-sectional views of the recoating unit corresponding to the passage of the entire time during which the recoating unit moves from the back side to the front side of the plane of the drawing. FIG. 4A illustrates an initial state of the cross section of the fabrication chamber at the start, FIG. 4B illustrates a state immediately before the recoating unit passes, FIG. 4C illustrates a state in which the powder 204 on the layered surface is flattened by the flattener 32, FIG. 4D illustrates a state immediately after the recoating unit has passed, and FIG. 4E illustrates an end state when the recoating unit has completely moved from the back side to the front side of the plane of the drawing.

As illustrated in FIG. 4A, the fabrication stage 31 and the layered surface 201 thereon are positioned at a designated height to obtain a desired layering step.

FIG. 4B illustrates powder 204 in a state in which the powder 203 is layered on the layered surface by the powder supplier 34. At this time, the powder 204 on the layered surface has a sufficient amount of powder to be leveled by the flattener 32. In the present embodiment, the powder is supplied from above the layered surface by the powder supplier 34, but the powder supply mode is not limited in particular as long as the powder is supplied to the layered surface.

As illustrated in FIG. 4C, a part of the powder caught in the flattener flows to the outside of the flattener. The powder is finally accumulated as powder 205 outside the powder collector 33.

As illustrated in FIG. 4D, immediately after passage of the recoating unit, a layered surface 206 is generated by the flattener.

As illustrated in FIG. 4E, the accumulated powder 205 disintegrates while having a repose angle according to powder characteristics, and becomes powder 205' in an equilibrium state.

In the three-dimensional object fabricating method and the three-dimensional object fabricating apparatus of the present disclosure, the powder collector is provided to collect the powder overflowing to the outer edge portion of the fabrication chamber by the flattener even if a container (groove) is not provided beside the fabrication chamber. Since there is no container (groove) beside the fabrication chamber, the user can drop a small amount of powder remaining at the outer edge portion into the fabrication chamber directly connected thereto, or easily collect the powder by a suction device or the like. Since the powder can be easily collected, the inside of the apparatus can be kept clean, thereby exerting great advantageous effects on safety such as preventing breakage and dust explosion of the apparatus. Furthermore, since it is not necessary to provide a container (groove) at the outer edge portion, the manufacturing cost of the apparatus can be suppressed.

Aspects of the present disclosure are as follows, for example.

Aspect 1

A method of fabricating a three-dimensional object includes supplying, flattening, and collecting. The supplying supplies, with a powder supplier, powder to a fabrication chamber. The fabrication chamber includes a fabrication stage to store powder and an outer edge portion outside the fabrication stage, the outer edge portion having one bottom surface. The flattening flattens, with a flattener, the powder supplied by the supplying. The collecting collects, with a powder collector, the powder having overflowed from the fabrication stage to the outer edge portion by the flattening into the fabrication stage.

Aspect 2

In the method according to aspect 1, the outer edge portion of the fabrication stage of the fabrication chamber has a vertical wall.

Aspect 3

In the method according to aspect 2, a gap between the vertical wall and the powder collector is 0.5 mm or more.

Aspect 4

In the method according to any one of aspects 1 to 3, the powder collector has an inclined surface whose rear end in an advance direction of the powder collector is proximate to the fabricating chamber.

Aspect 5

In the method according to any one of aspects 1 to 4, the powder collector is attached to the flattener.

Aspect 6

In the method according to any one of aspects 1 to 5, the powder collector is made of at least metal.

Aspect 7

In the three-dimensional object fabricating method according to any one of aspects 1 to 6, the flattening includes flattening the powder with the flattener and another flattener in front of or behind the powder supplier in a scanning direction of the powder supplier.

Aspect 8

In the method according to any one of aspects 2 to 7, a position of a surface of the powder flattened by the flattening is higher than a top of the vertical wall.

Aspect 9

In the method according to any one of aspects 2 to 7, a position of a surface of the powder flattened by the flattening is same as a top of the vertical wall.

Aspect 10

In the method according to any one of aspects 1 to 9, the powder collector drops the powder at the outer edge portion into the fabrication chamber when the powder supplier moves without supplying the powder.

Aspect 11 an apparatus for fabricating a three-dimensional object includes a fabrication chamber, a powder supplier, a flattener, and a powder collector. The fabrication chamber includes a fabrication stage to store powder and an outer edge portion outside the fabrication stage. The powder supplier supplies the powder to the fabrication chamber. The flattener flattens the powder supplied by the powder supplier. The powder collector collects, into the fabrication stage, the powder having overflowed from the fabrication stage to the outer edge portion by the flattener.

According to the three-dimensional object fabricating method according to any one of aspects 1 to 10 and the three-dimensional object fabricating apparatus according to aspect 11, various conventional disadvantages can be eliminated and the object of the present disclosure can be achieved.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

Any one of the above-described operations may be performed in various other ways, for example, in an order different from the one described above.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions.

The invention claimed is:

1. A method of fabricating a three-dimensional object, the method comprising:
supplying, with a powder supplier, powder to a fabrication chamber, the fabrication chamber including a fabrication stage to store powder and an outer edge portion outside the fabrication stage, the outer edge portion having one bottom surface;
flattening, with a flattener, the powder supplied by the supplying; and
collecting, with a powder collector, the powder having overflowed from the fabrication stage to the outer edge portion by the flattening into the fabrication stage,
wherein the powder collector collects the powder on the outer edge portion directly into the fabrication stage.

2. The method according to claim 1,
wherein the outer edge portion has a vertical wall.

3. The method according to claim 2,
wherein a gap between the vertical wall and the powder collector is 0.5 mm or more.

4. The method according to claim 1,
wherein the powder collector has an inclined surface whose rear end in an advance direction of the powder collector is proximate to the fabricating chamber.

5. The method according to claim 1,
wherein the powder collector is attached to the flattener.

6. The method according to claim 1,
wherein the powder collector is made of at least metal.

7. The method according to claim 1,
wherein the flattening includes flattening the powder with the flattener and another flattener in front of or behind the powder supplier in a scanning direction of the powder supplier.

8. The method according to claim 2,
wherein a position of a surface of the powder flattened by the flattening is higher than a top of the vertical wall.

9. The method according to claim 2,
wherein a position of a surface of the powder flattened by the flattening is same as a top of the vertical wall.

10. The method according to claim 1, wherein the powder collector drops the powder at the outer edge portion into the fabrication chamber when the powder supplier moves without supplying the powder.

11. An apparatus for fabricating a three-dimensional object, the apparatus comprising:
- a fabrication chamber including a fabrication stage to store powder and an outer edge portion outside the fabrication stage;
- a powder supplier to supply the powder to the fabrication chamber;
- a flattener to flatten the powder supplied by the powder supplier; and
- a powder collector to collect, into the fabrication stage, the powder having overflowed from the fabrication stage to the outer edge portion by the flattener, wherein the powder collector is configured to collect the powder on the outer edge portion directly into the fabrication stage.

* * * * *